Jan. 12, 1926.  1,569,160
B. L. VAN ORMAN ET AL
WIRE SPRING NESTING OR ASSEMBLING MACHINE
Filed March 30, 1925   11 Sheets-Sheet 1
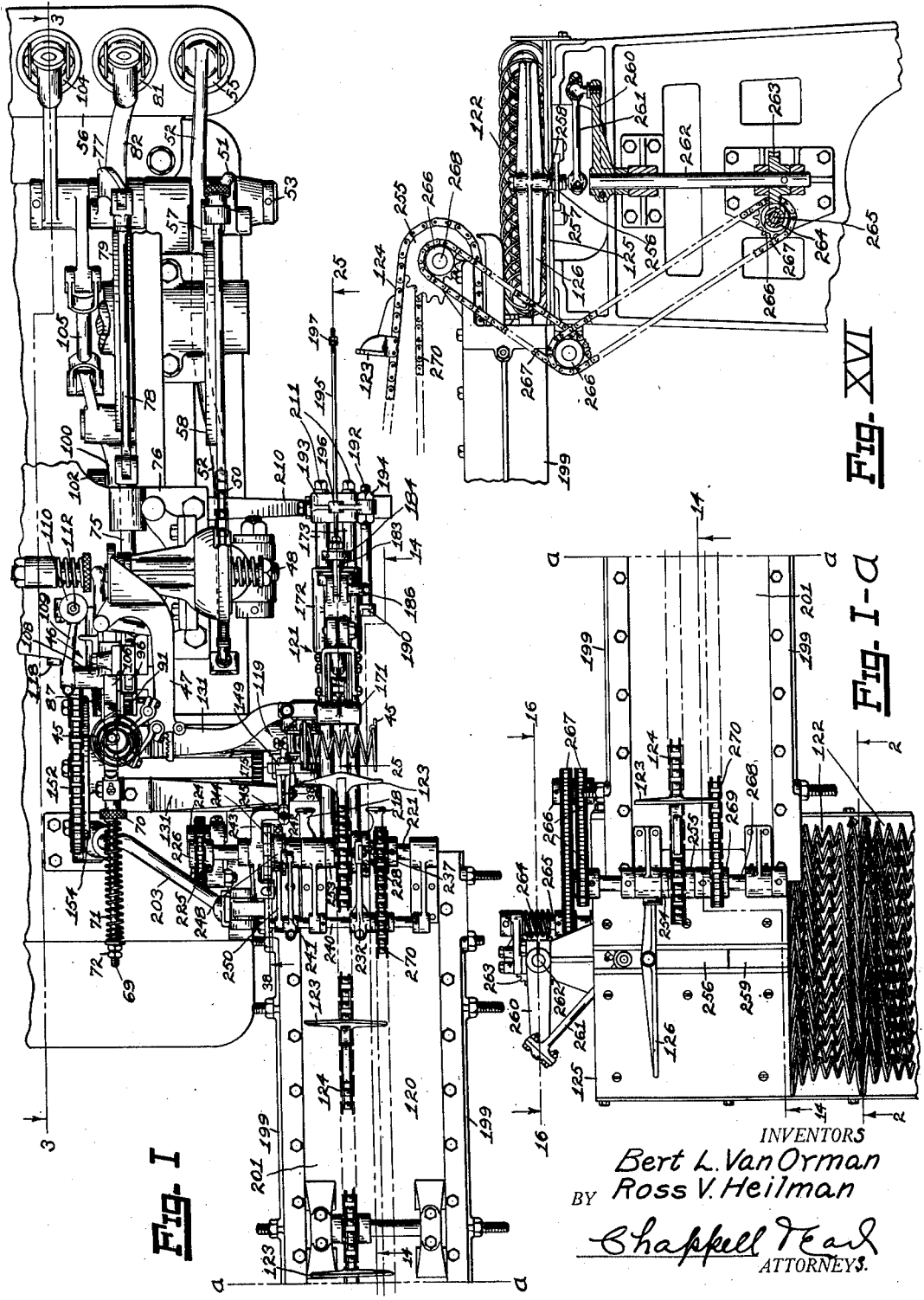
INVENTORS
Bert L. Van Orman
Ross V. Heilman
BY
Chappell Earl
ATTORNEYS.

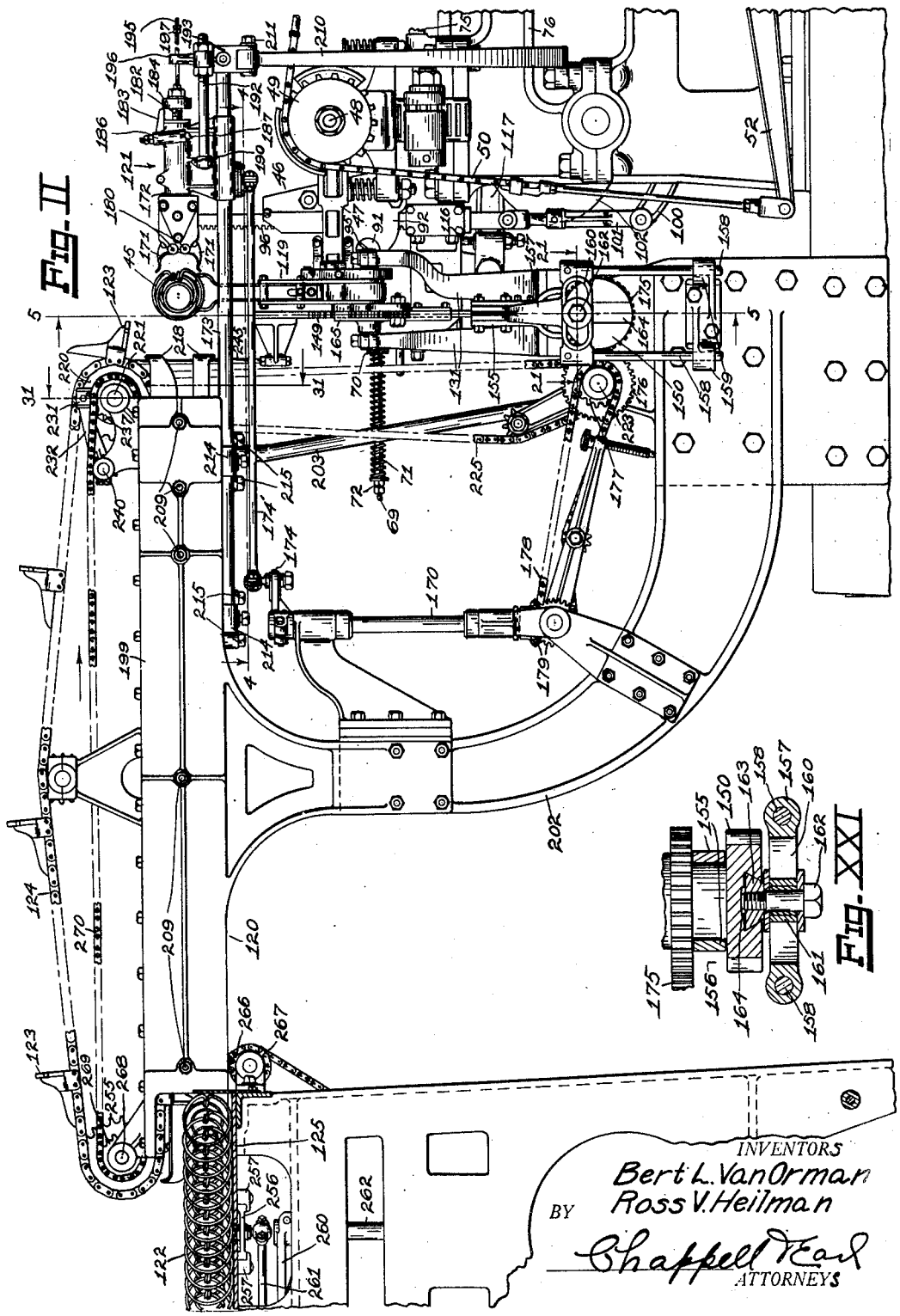

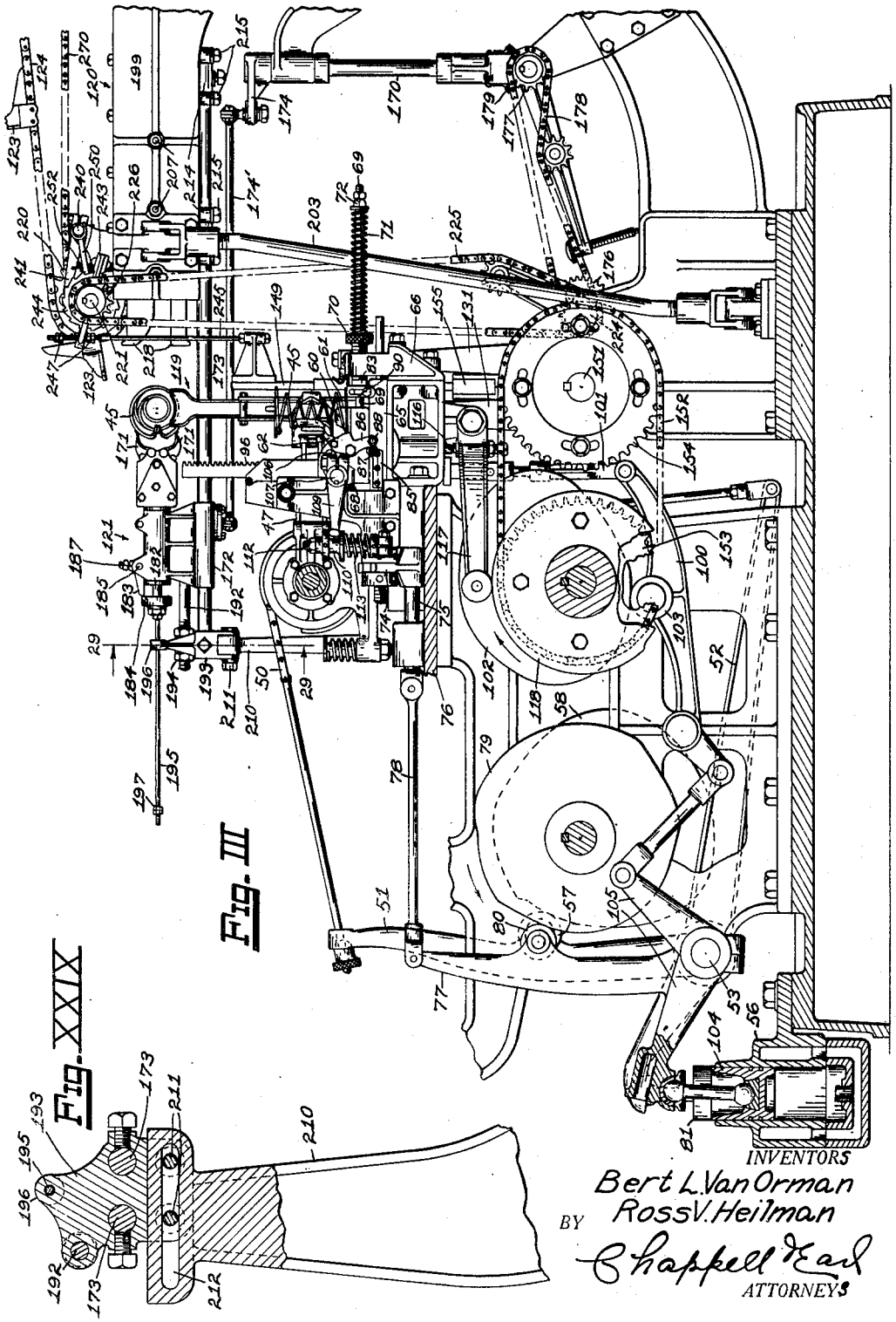

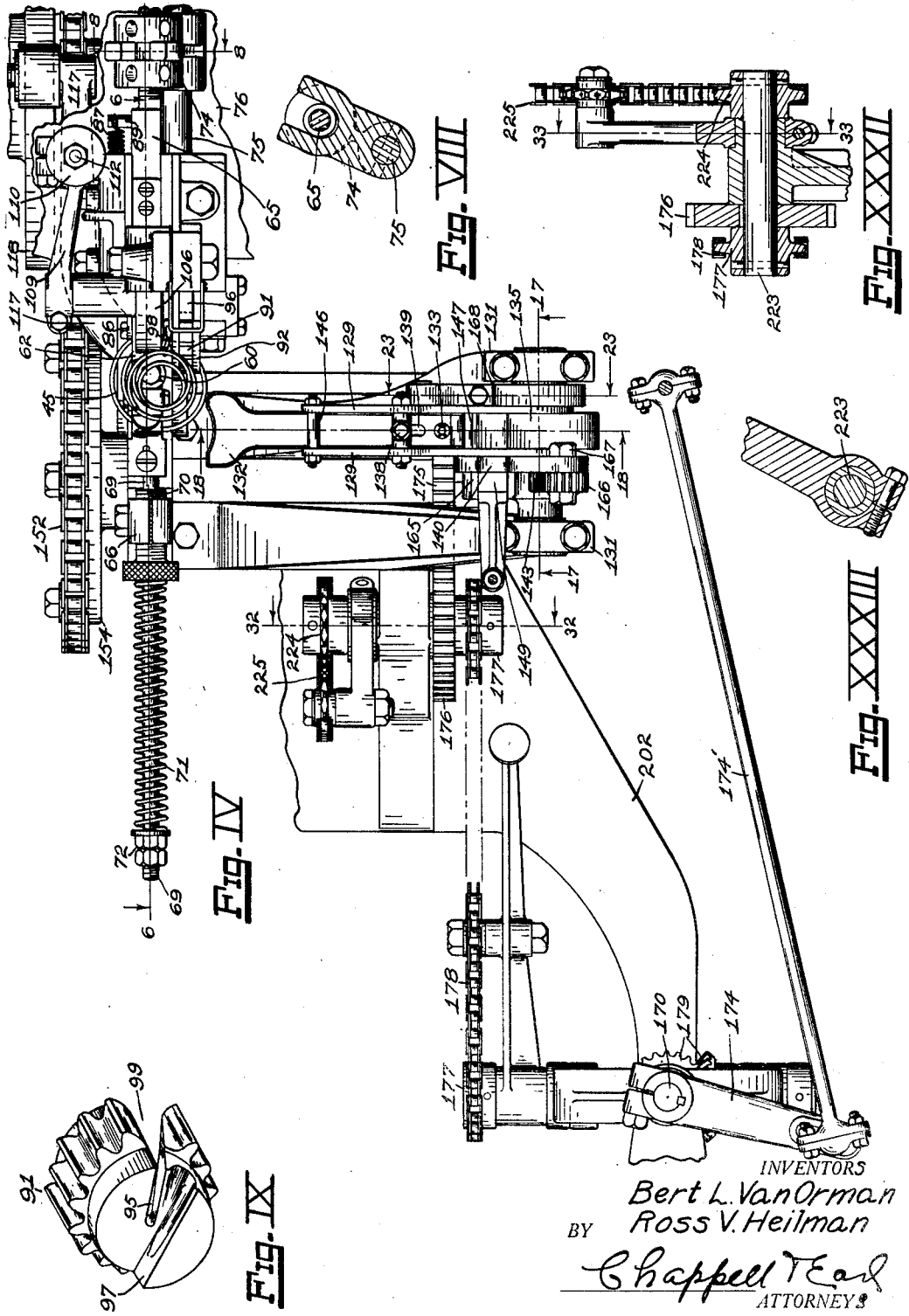

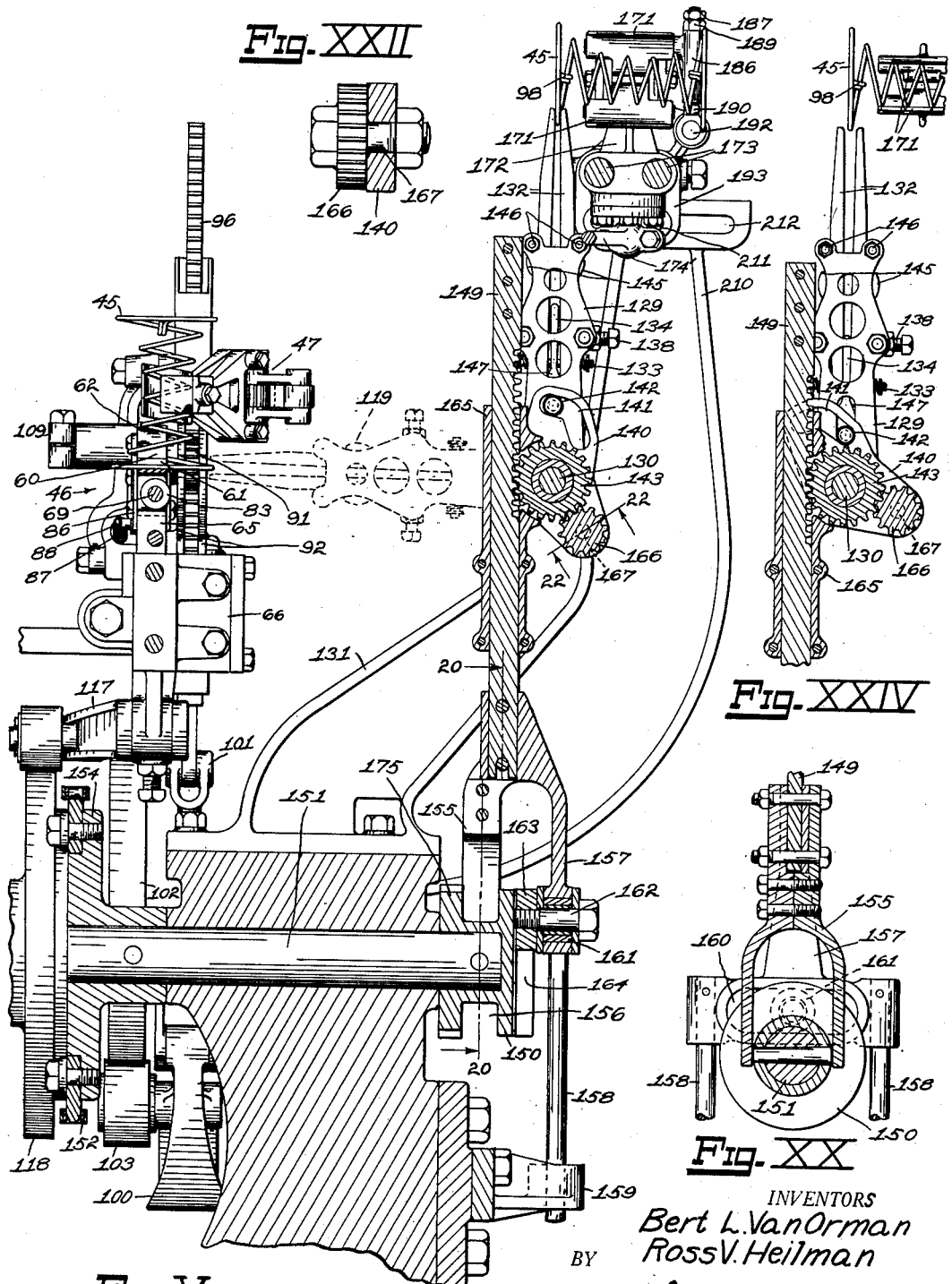

Jan. 12, 1926. 1,569,160
B. L. VAN ORMAN ET AL
WIRE SPRING NESTING OR ASSEMBLING MACHINE
Filed March 30, 1925 11 Sheets-Sheet 6
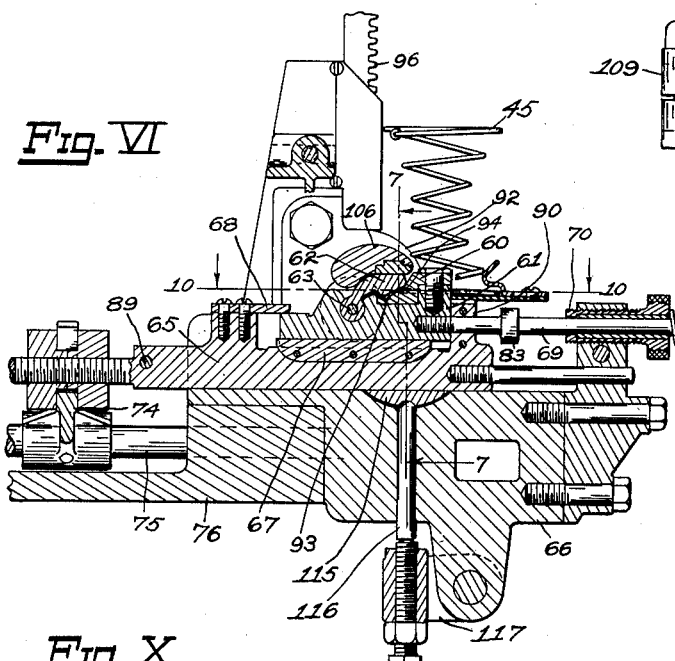
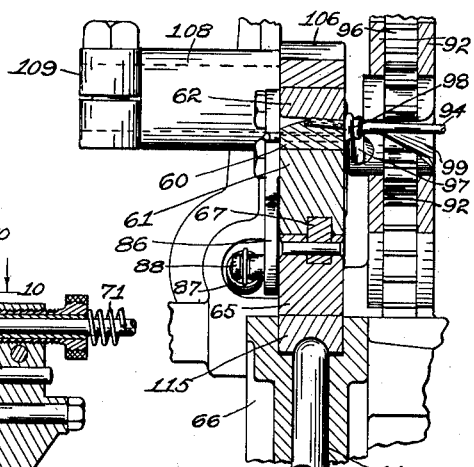
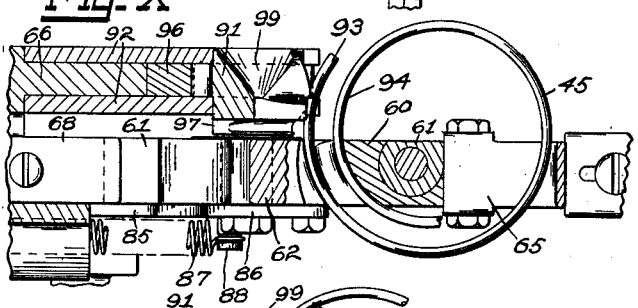
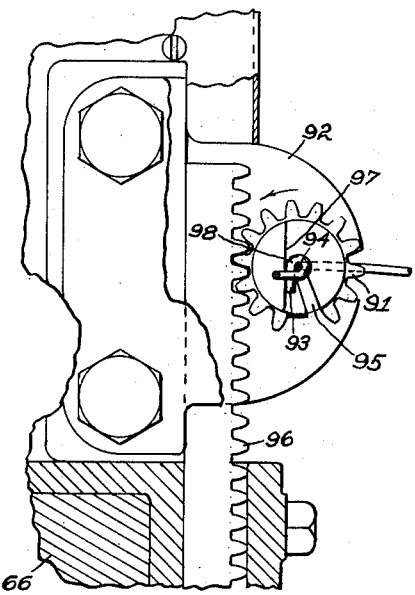
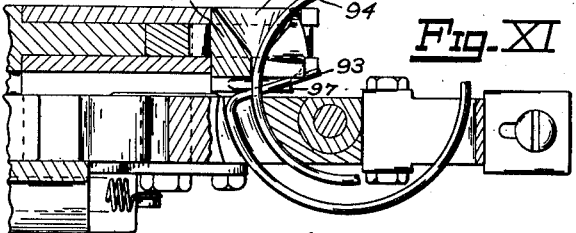
INVENTORS
Bert L. Van Orman
BY Ross V. Heilman
Chappell Earl
ATTORNEYS

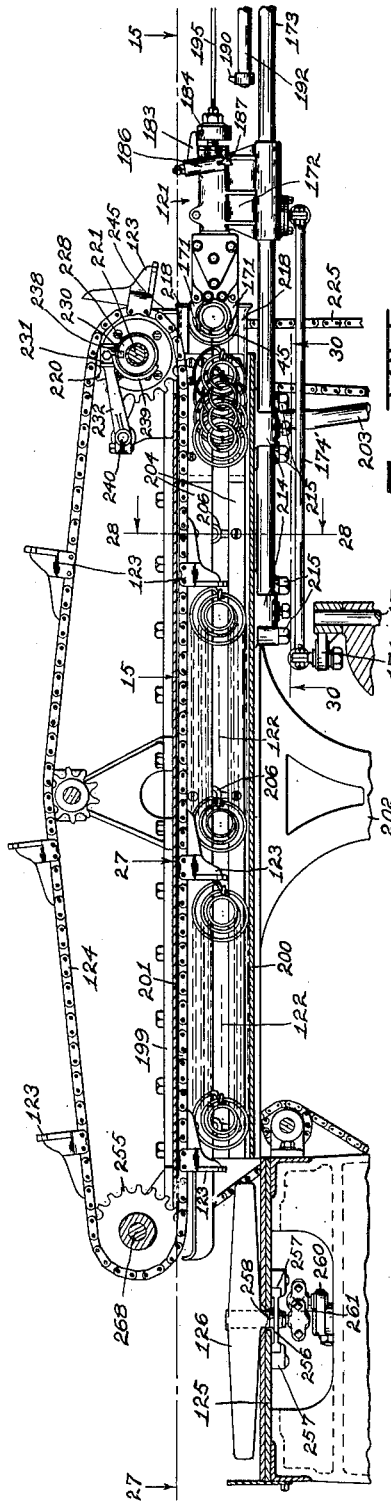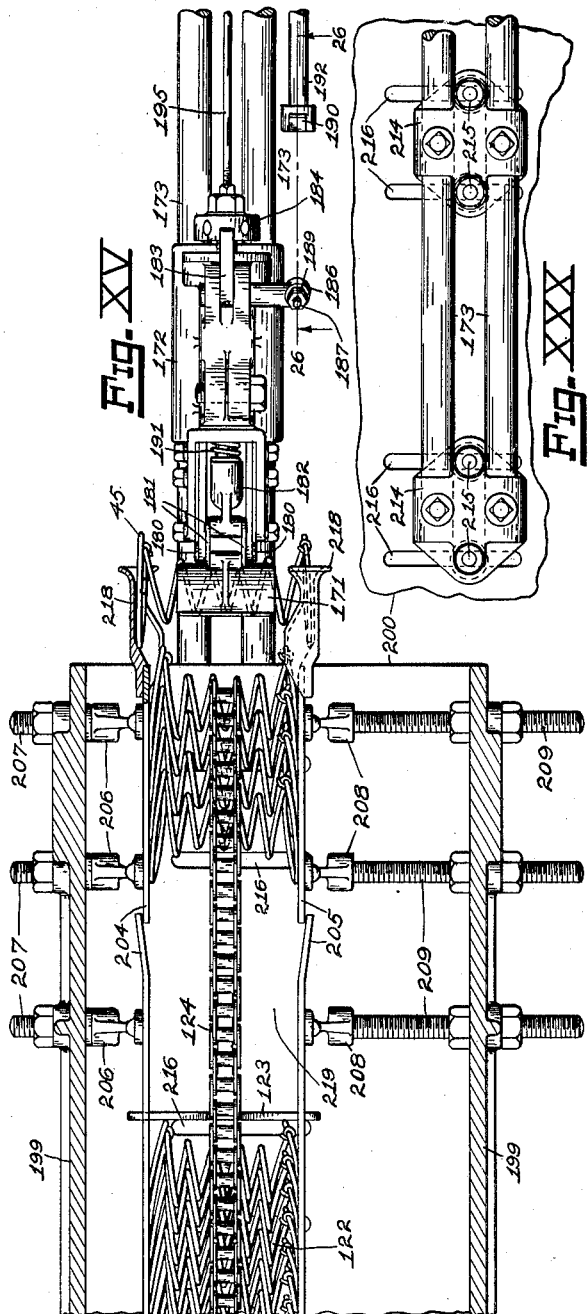

Jan. 12, 1926.  
B. L. VAN ORMAN ET AL  
1,569,160  
WIRE SPRING NESTING OR ASSEMBLING MACHINE  
Filed March 30, 1925   11 Sheets-Sheet 8
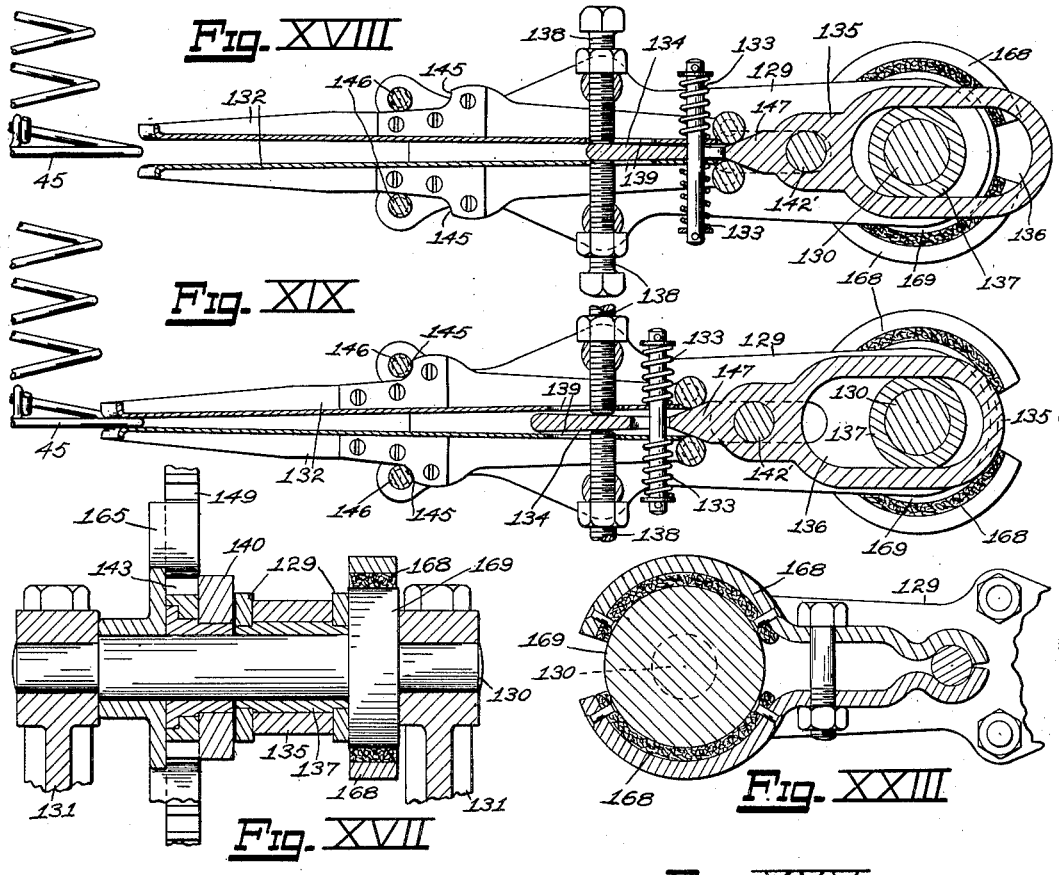
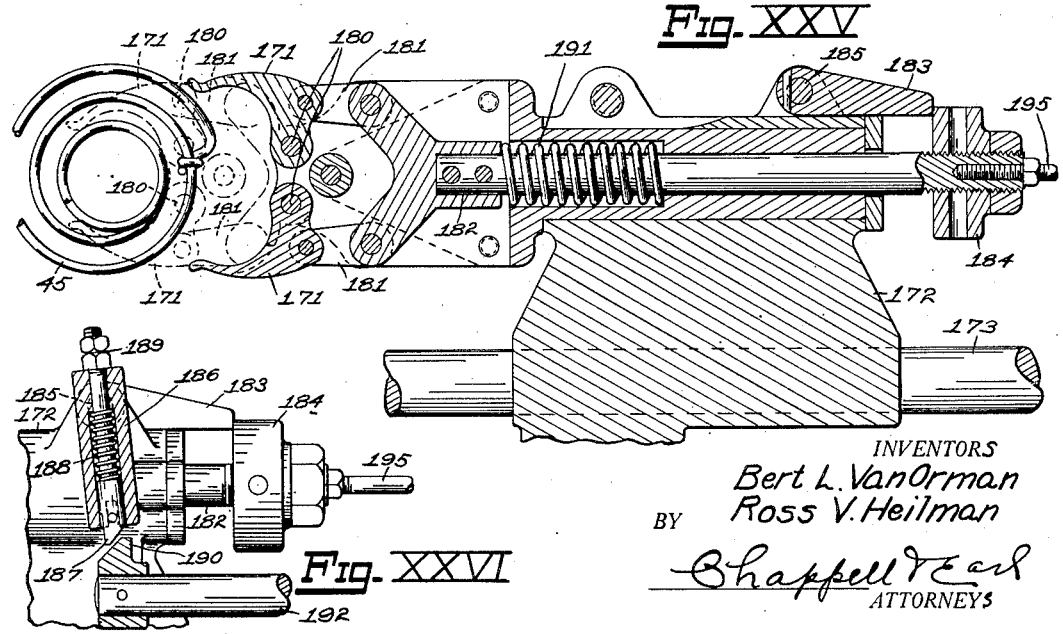
INVENTORS  
Bert L. Van Orman  
Ross V. Heilman  
BY  
Chappell & Earl  
ATTORNEYS

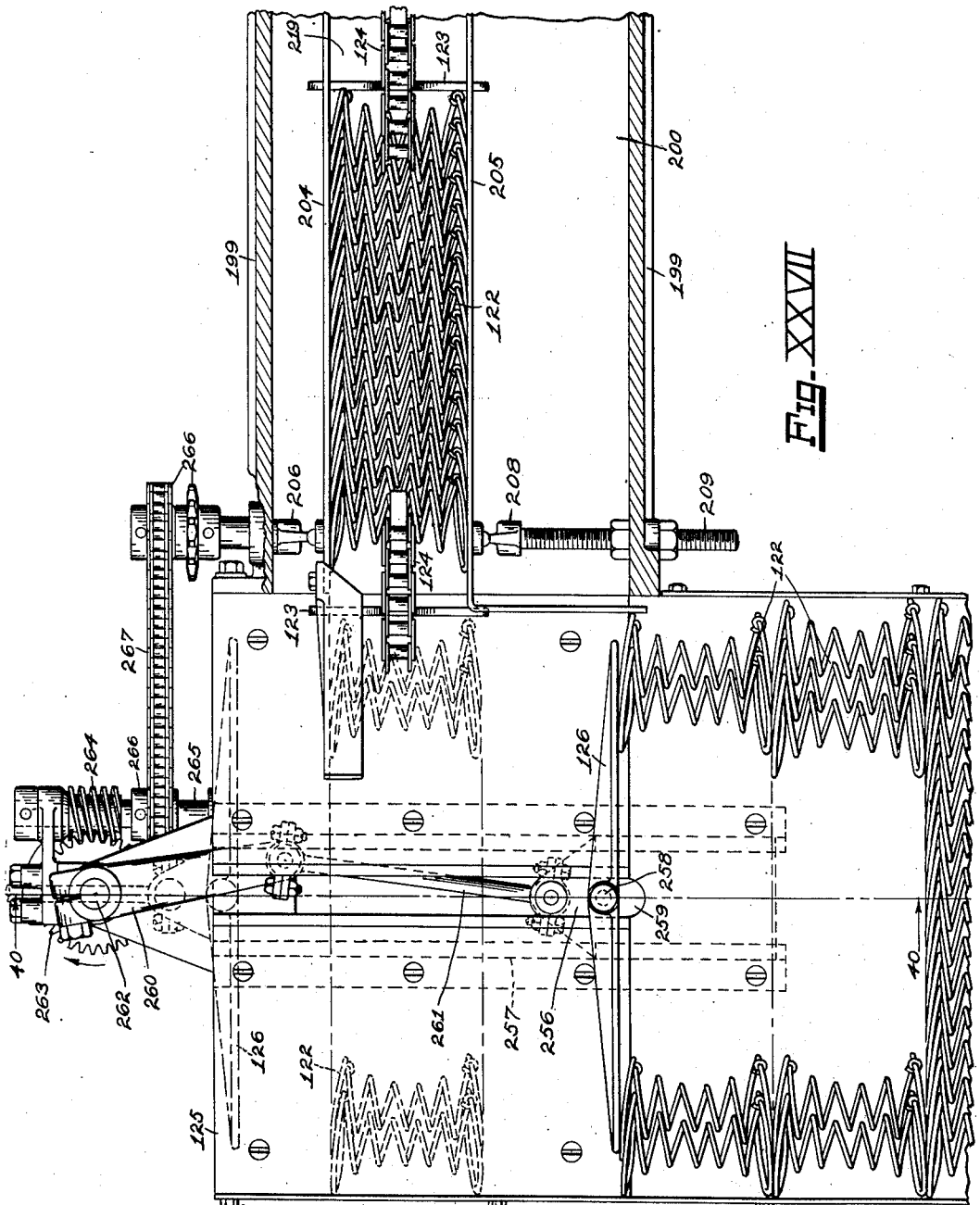

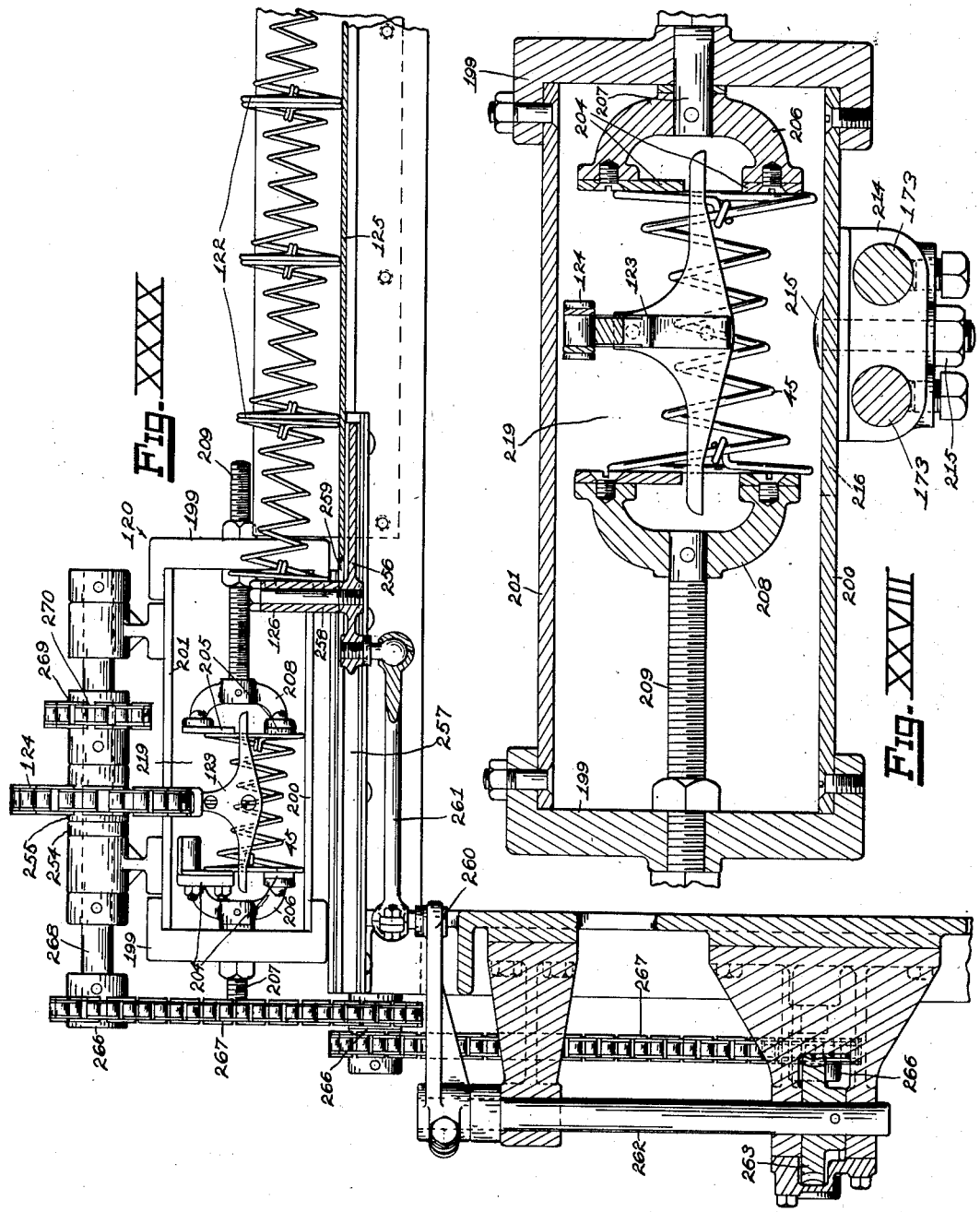

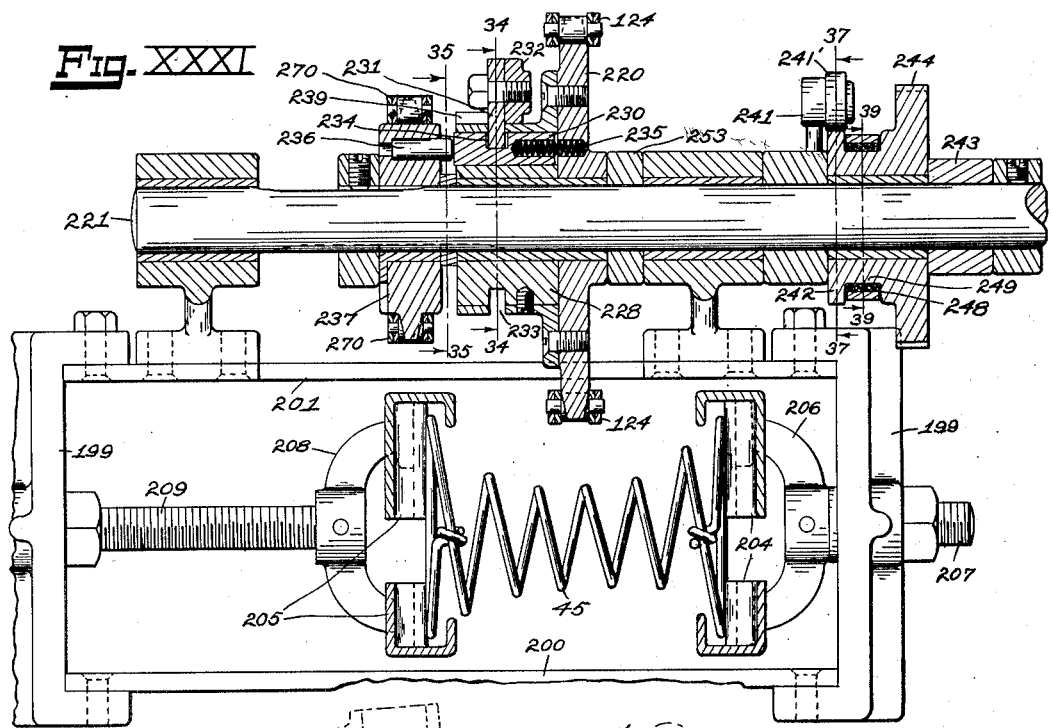

Patented Jan. 12, 1926.

1,569,160

UNITED STATES PATENT OFFICE.

BERT L. VAN ORMAN, OF HIGHLAND PARK, AND ROSS V. HEILMAN, OF DETROIT, MICHIGAN, ASSIGNORS TO L. A. YOUNG INDUSTRIES, INC., OF DETROIT, MICHIGAN.

WIRE-SPRING NESTING OR ASSEMBLING MACHINE.

Application filed March 30, 1925. Serial No. 19,436.

*To all whom it may concern:*

Be it known that we, BERT L. VAN ORMAN and ROSS V. HEILMAN, citizens of the United States, residing at Highland Park and Detroit, county of Wayne, State of Michigan, respectively, have invented certain new and useful Improvements in Wire-Spring Nesting or Assembling Machines, of which the following is a specification.

This invention relates to improvements in wire spring nesting or assembling machines.

Our improvements are especially designed by us for use in connection with wire spring making machines such as shown in Letters Patent to the applicant Van Orman No. 1,480,796, dated January 15, 1924, and we have illustrated the same in the accompanying drawings as developed and embodied for use in such spring making machines. Our improvements are, however, desirable and readily adapted for use in other relations.

The main object of this invention is to provide an improved nesting or assembling machine for coiled wire springs by means of which they are automatically taken from the spring forming machine and nested or assembled into a compact relation for convenient handling or storage.

A further object is to provide means for assembling or nesting quantities of springs as delivered from a spring making machine into a compact assembly, thereby reducing the space required for shipping and storage.

A still further object is to provide means for adjusting the assembling mechanism to springs of different sizes.

Objects relating to details and economies of construction and operation will definitely appear from the detailed description to follow.

We accomplish the objects of our invention by the devices and means described in the following specification. The invention is clearly defined and pointed out in the claims.

A structure which is a preferred embodiment of our invention is clearly illustrated in the accompanying drawing, forming a part of this application, in which:

Fig. I, Sheet 1, is a partial plan view of a structure embodying the invention.

Fig. I$^a$, Sheet 1, is a continuation of Fig. I from a line corresponding to line a—a thereof.

Fig. II, Sheet 2, is a fragmentary view partially in elevation and partially in section on a line corresponding to line 2—2 of Fig. I$^a$.

Fig. III, Sheet 3, is a view partially in elevation and partially in section on a line corresponding to line 3—3 of Fig. I.

Fig. IV, Sheet 4, is an enlarged fragmentary plan view taken from a line corresponding to line 4—4 of Fig. II, with parts in another position.

Fig. V, Sheet 5, is an enlarged detail view partially in vertical section on a line corresponding to line 5—5 of Fig. II, illustrating details of the wire spring knotting and the spring transfer mechanisms.

Fig. VI, Sheet 6, is a view in section on a line corresponding to line 6—6 of Fig. IV, illustrating further details of the knotter.

Fig. VII, Sheet 6, is an enlarged detail view in section on a line corresponding to line 7—7 of Fig. VI.

Fig. VIII, Sheet 4, is a view in section on a line corresponding to line 8—8 of Fig. IV, illustrating details of the knotter actuating means.

Fig. IX, Sheet 4, is an enlarged detail perspective view of the knotting pinion.

Figs. X, XI and XII, Sheet 6, are enlarged views in section on a line corresponding to line 10—10 of Fig. VI, with the parts in the positions of successive stages of the knotting operation.

Fig. XIII, Sheet 6, is a detail view in section on a line corresponding to line 13—13 of Fig. XII.

Fig. XIV, Sheet 7, is a view mainly in section on a line corresponding to lines 14—14 of Figs. I and I$^a$, illustrating details of the spring assembling chute or chamber.

Fig. XV, Sheet 7, is an enlarged detail view partially in section on a line corresponding to line 15—15 of Fig. XIV, illustrating further details of the assembling chute or chamber.

Fig. XVI, Sheet 1, is a fragmentary view partially in elevation and partially in section on a line corresponding to line 16—16 of Fig. I*, illustrating details of the spring delivery table.

Fig. XVII, Sheet 8, is an enlarged detail view in section on a line corresponding to line 17—17 of Fig. IV, illustrating details of one of the transfer members.

Fig. XVIII, Sheet 8, is an enlarged view in section on a line corresponding to line 18—18 of Fig. IV, showing further details of the transfer member.

Fig. XIX, Sheet 8, is a view similar to Fig. XVIII, with the parts in another position.

Fig. XX, Sheet 5, is a view in section on a line corrsponding to line 20—20 of Fig. V, illustrating details of the transfer member actuating means.

Fig. XXI, Sheet 2, is an enlarged detail view in section on a line corresponding to line 21—21 of Fig. II, showing further details of the parts illustrated in Fig. XX.

Fig. XXII, Sheet 5, is an enlarged view partially in section on a line corresponding to line 22—22 of Fig. V, illustrating details of the transfer member adjusting means.

Fig. XXIII, Sheet 8, is an enlarged view in section on a line corresponding to line 23—23 of Fig. IV, illustrating details of a brake for the spring transfer member.

Fig. XXIV, Sheet 5, is a fragmentary view similar to a portion of Fig. V, with the parts in another position.

Fig. XXV, Sheet 8, is an enlarged detail view mainly in section on a line corresponding to line 25—25 of Fig. I, illustrating details of the second spring transfer member.

Fig. XXVI, Sheet 8, is an enlarged fragmentary view partially in elevation and partially in section on a line corresponding to line 26—26 of Fig. XV, with parts in another position.

Fig. XXVII, Sheet 9, is an enlarged fragmentary view which is partially a plan and partially a section on a line corresponding to line 27—27 of Fig. XIV, showing details of the spring nesting chamber and details of the spring delivery table.

Fig. XXVIII, Sheet 10, is an enlarged detail view in section on a line corresponding to line 28—28 of Fig. XIV, illustrating further details of the nesting chamber.

Fig. XXIX, Sheet 3, is an enlarged detail view in section on a line corresponding to line 29—29 of Fig. III, showing adjusting means for the second spring transfer member.

Fig. XXX, Sheet 7, is an enlarged fragmentary bottom view taken from a line corresponding to line 30—30 of Fig. XIV, showing further details of the transfer member adjusting means.

Fig. XXXI, Sheet 11, is an enlarged detail view in section on a line corresponding to line 31—31 of Fig. II, showing details of the ejector drive shaft.

Fig. XXXII, Sheet 4, is a detail view in section on a line corresponding to line 32—32 of Fig. IV, illustrating details of spring transfer and ejector driving means.

Fig. XXXIII, Sheet 4, is a detail view in section on a line corresponding to line 33—33 of Fig. XXXII.

Fig. XXXIV, Sheet 11, is a view in section on a line corresponding to line 34—34 of Fig. XXXI, showing details of the spring ejector clutch.

Fig. XXXV, Sheet 11, is a view in section on a line corresponding to line 35—35 of Fig. XXXI, showing further clutch details with the parts in another position.

Fig. XXXVI, Sheet 11, is a detail view in section on a line corresponding to line 36—36 of Fig. XXXV.

Fig. XXXVII, Sheet 11, is a view in section on a line corresponding to line 37—37 of Fig. XXXI, illustrating details of the clutch control cam and cam lever.

Fig. XXXVIII, Sheet 11, is an enlarged view in section on a line corresponding to line 38—38 of Fig. I, illustrating further clutch control details.

Fig. XXXIX, Sheet 11, is a detail view in section on a line corresponding to line 39—39 of Fig. XXXI, illustrating further clutch control details.

Fig. XXXX, Sheet 10, is a view in section on a line corresponding to line 40—40 of Fig. XXVII, illustrating details of the spring ejecting means and spring delivery table.

In the drawings similar reference characters refer to similar parts throughout the several views, and the sectional views are taken looking in the direction of the little arrows at the ends of the section lines.

In our present embodiment we have illustrated only such portions of a spring making machine as are deemed necessary to show the connection and relation of our improvements thereto.

The final operation of the spring making machine consists of knotting one end of the wire about an adjacent coil of the spring, a similar knotting operation having already been performed upon the other end of the spring by another part of the machine. In Figs. I, III and V, the spring 45, the work, is shown in position in the holding jaws of the second knotting mechanism, designated generally by the numeral 46, to which the spring has been conveyed by a transfer member 47 which is pivoted at 48 and adapted to oscillate between the knotter and the spring positioning member disclosed in the patent referred to above.

A means of oscillating the member 47 comprises a sprocket 49 on the pivot shaft 48, the sprocket being engaged by a chain 50 which is in tension between a cam lever 51 and an opposed lever 52 (see Figs. I, II and III). The lever 52 is pivoted at 53 and yieldingly actuated by pressure against a piston 55 from compressed air in a cylinder unit 56. The elasticity of the compressed air serves as a spring to hold the roller 57 of the cam lever 51 in contact with the cam 58. Since the transfer member 47 does not comprise a part of our present invention, it is not described in detail herein, it being deemed sufficient to state that springs are delivered successively to the knotter mechanism 46 in timed relation to the operation of the latter.

The knotting mechanism comprises a lower spring holder jaw 60 which is secured to a jaw supporting member 61, an upper coacting jaw 62 being pivoted at 63 to the member 61 (see Figs. III and VI). The member 61 is reciprocable in a jaw actuating member 65 which is reciprocable in the main knotter bracket 66. The member 61 is retained in alignment in the actuating member 65 by a feather key 67, upward displacement being prevented by a retaining clip 68 (see Figs. III, VI and VII). A pull rod 69 which is secured to the member 61 is reciprocable in an opening in the member 65 and also in an adjustable stop nut 70 in the bracket 66. A spring 71 disposed between the nut 70 and check nuts 72 on the outer end of the rod 69 tends to yieldingly pull the jaw supporting member 61 toward the nut 70.

The actuating member 65 is connected by an adjustable connection 74 (see Figs. IV, VI and VIII) to a slide rod 75 which is reciprocable in the main frame 76 of the machine. The rod 75 is reciprocated by a cam lever 77 to which it is connected by a connecting rod 78 (see Figs. I, II and III). The cam lever is actuated by a cam 79, the roller 80 being yieldingly held in contact with the cam by air pressure in the cylinder unit 56 against a piston 81 which is operatively connected with an arm 82 of the cam lever.

In Figs. I and III, the jaw supporting member 61 is shown in its outer position which is limited by engagement of a collar 83 on the rod 69 with the stop nut 70. The collar 83 is located a sufficient distance from the member 61 to allow continued outward movement of the actuating member 65 after the member 61 has come to rest (see Fig. VI). This continued movement causes a tappet 85 on the member 65 to engage an arm 86 projecting from the upper jaw 62 thereby swinging the jaw to open position (see Fig. III). The jaws are now in position to receive the spring 45 from the transfer member 47. While the spring is being released from the transfer member, the jaw actuating member starts moving inwardly thereby causing the upper jaw 62 to close upon the lower coils of the spring. The jaw is pulled to closed position by a yielding connection 87 between a pin 88, projecting from the arm 86, and a pin 89 projecting from the member 65 (see Figs. III and IV).

After the jaw 62 has been closed upon the spring 45, a shoulder 90 on the actuating slide member 65 engages the jaw supporting member 61 and carries the spring 45 into engagement with a knotter pinion 91 which is rotatable in bearing plates 92. A preferred type of knotter pinion is illustrated in detail in Fig. IX. As the spring 45 advances toward the knotter pinion, the latter is first engaged by the free end portion 93 of the lower coil of wire (see Fig. X). As the spring moves into operative relation to the pinion, the end portion of wire 93 is bent as shown in Fig. XI, a portion of the second coil 94 having entered a slot 95 in the pinion and lying substantially in the axial center of rotation of the pinion. The pinion is now rotated by a rack 96 which is vertically reciprocable in appropriate guides in the knotter bracket 66. Rotation of the pinion 91 causes a ledge or shoulder 97 on the side of the pinion to engage the end portion of wire 93 and wind it around the coil 94 (see Figs. IV, XII and XIII) thus forming the knot 98. A conical recess 99 in the knotter pinion 91 provides clearance for rotation of the pinion around the curved wire of the coil.

The rack 96 is reciprocated by a cam lever 100 to which the rack is connected by a link 101, the lever being actuated by a cam member 102 (see Fig. III). A roller 103 on the lever 100 is yieldingly held against the cam member by air pressure from the cylinder unit 56 against a piston 104 which is operatively connected with the cam lever by a series of levers 105.

When the spring 45 moves into operative relation to the knotter pinion, the upper jaw 62 passes underneath a pressure member 106 which serves to yieldingly hold the jaw closed upon the spring during the knotting operation (see Figs. III, IV, VI and VII). The member 106 is fixed to a shaft 107, which is rotatable in a bracket 108, an arm 109 on the shaft engaging a sleeve-like member 110 which is yieldingly supported on a spring keeper 112 by a spring 113. The spring 113 offers sufficient resistance to movement of the pressure member 106 to hold the jaw 62 closed under normal conditions of operation, but yields in case the jaw is prevented from closing by misplacement of wire on the lower jaw 60.

After the spring 45 has been moved into operative relation with the knotter pinion, a lower pressure shoe 115 co-operates with the member 106 to hold the jaw 60 and 62 closed firmly upon the spring while the knot is being formed (see Figs. VI and VII). The member 115 is thrust upwardly from a recess in the bracket 66 against the lower surface of the actuating member 65 after the latter has come to rest, the member 115 being lifted by a tappet 116 which is engaged by a cam lever 117 actuated by a cam member 118 (see Figs. III and IV).

After the knot 98 has been formed on the spring 45, the pinion 91 is brought to rest with the slot 95 in substantially horizontal position to permit withdrawal of the spring from the pinion. The jaw supporting member 61 is then moved to outer position and the upper jaw 62 opened thereby leaving the spring 45 free to be removed from the knotter. The rack 96 is lifted to initial position before the introduction of the next spring to the knotter pinion, the latter coming to rest in correct position to receive the spring.

In general, the operation of nesting the springs consists of transferring each of the springs 45 by a transfer member, designated generally by the numeral 119, from the knotting mechanism to a position in alignment with a nesting chamber or assembling chute 120 into which the springs are consecutively deposited by another transfer member, designated generally by the numeral 121 (see Figs. I, II and XIV), the mouth of the chute 120 being appropriately shaped to cause the coils of the springs to be closely intermeshed (see Fig. XV). The nested springs are grouped into bundles 122 of a predetermined number of springs and discharged from the assembling chute by flights 123 on an endless chain 124 which intermittently moves the flights to advance the groups of springs through the chute 120 with a step by step movement. The bundles or units of nested springs 122 are consecutively ejected from the chute 120 upon a delivery table 125 and are moved along the table by a pusher member 126 which serves to keep the ejected springs cleared from the end of the nesting chute (see Figs. Iª, II, XIV and XVI). The delivery table may be of any desired length to provide space for collecting a considerable quantity of bundles of springs which may be removed from the table at the convenience of the operator without interrupting the operation of the spring making machine.

While the spring 45 is being discharged from the knotting mechanism of the spring making machine, the lower coil of the spring is seized by the transfer member 119 which lifts the spring into alignment with the assembling chute 120 (see Fig. V). The transfer member consists of side members 129 which are pivoted on a stationary shaft 130 supported by a bracket 131 (see Figs. IV and XVII). Gripper jaws 132 carried by the members 129 are normally held open by springs 133 (see Fig. XVIII) which bear against the outer surfaces of the gripper jaws and yeldingly hold the inner surfaces of the gripper jaws in contact with an inwardly tapered section 134 of the gripper jaw actuating member 135, each jaw being held parallel with the adjacent face of the section 134. The other end of the actuating member 135 is in the form of an elongated slot 136 enclosing a bushing 137 on the shaft 130 which serves as a guide for reciprocation of the member 135 in the supporting members 129. The end 134 of the actuating member is held in central alignment between the ends of opposed guide screws 138 which project through slots 139 in the jaws 132.

The gripper actuating member 135 is reciprocated by a cam member 140 which has a slot 141 engaging a roller 142 on the member 135 (see Fig. V) the roller turning on a pin 142' in the member 135. The cam member 140 is secured to a pinion 143 which is pivoted on the shaft 130. The slot 141 is so disposed as to move the roller 142 away from the pivot shaft 130 whenever the pinion 143 is rotated in one direction with the members 129 remaining stationary and to cause a reverse movement when the pinion rotates in the opposite direction.

When the trasfer member 119 first reaches its lower or receiving position, the gripper jaws 132 are open and retracted out of range of the spring 45 (see Fig. XVIII and dotted outline in Fig. V). As the member 135 slides outward from the shaft 130, the gripper jaws are moved toward the spring 45 until the outer ends of the jaws enclose part of the lower coil of the spring. Shoulders 145 on the jaws now come into contact with stops 146 and prevent further outward movement of the jaws. Continued outward movement of the jaw actuating member 135 causes a wedgelike portion 147 of the member 135 to overcome the pressure of the springs 133 and spread the inner ends of the jaws 132, thereby causing a lever action of the jaws, the stops 146 serving as fulcrums and the outer ends of the jaws closing upon the lower coil of the spring 45 (see Fig. XIX). The action of the jaws 132 is reversed to release the spring, movement of the member 135 toward the shaft 130 first allowing the jaws to open and then pulling them to retracted position.

The pinion 143 is actuated by a rack 149 which is reciprocated vertically by a crank wheel 150 carried by the shaft 151 (see Figs. II and V). The shaft 151 is operatively connected with one of the main shafts of the spring making machine by a chain 152 which engages sprockets 153 and 154 (see Fig. III). The rack 149 is supported at its lower end by a yoke 155 which engages a groove 156 in the crank wheel 150 to hold the rack in alignment (see Figs. V. XX and XXI).

An arm 157 projecting downwardly from the front side of the yoke 155 carries vertical guide rods 158 reciprocable in bearing brackets 159 to aid in keeping the rack aligned. As a means of imparting motion from the crank wheel to the rack, a slot 160 in the arm 157 is engaged by a roller 161 on the crank pin 162. To provide means of changing the length of stroke of the rack 149, the crank pin 162 is carried by a block 163 which is slidable in a dovetailed way 164 in the face of the crank wheel 150 (see Figs. II, V and XXI). By adjusting the crank pin nearer to or further from the center of the wheel the throw of the crank may be varied as desired.

The upper portion of the rack 149 is supported by the rack and pinion housing 165 which is pivoted on the shaft 130 and serves as a guide for the rack (see Figs. V and XVII). To provide means of changing the position of the transfer member 119 relative to the rack 149, the cam member 140 is locked to the pinion 143 by an adjusting pinion 166 which is clamped to the cam member by a bolt 167, the latter being fixed to the adjusting pinion (see Figs. V. and XXII). By loosening the nut on the bolt 167, the cam member 140 may be turned to a different position relative to the pinion 143, the adjusting pinion 166 being reclamped to the cam member in its new position. This adjusting means in conjunction with the means of adjusting the throw of the crank pin 162, provides means of definitely determining the range of movement of the transfer member 119.

When the crank pin 162 is in its extreme lower position, the transfer member 119 is in lower position with the jaws 132 in open and in retracted position, (see dotted outline in Fig. V). One of the side members 129 carries brake shoes 168 which frictionally engage a collar 169 on the shaft 130 (see Figs. IV and XXIII) and offer sufficient resistance against movement of the side members 129 to cause the cam member 140 to be actuated before the entire transfer member starts swinging on the pivot shaft 130. Thus when the crank pin 162 rises from lower position, the movement of the rack 149 first causes the jaw actuating member 135 to push the gripper jaws 132 outward until the ends enclose the lower coil of the spring and then to close the jaws upon the coil. While the jaws 132 are being projected toward the spring 45, the spring is withdrawn from knotting position (see Fig. IV) and moved to a position substantially in alignment with the jaws 132 before the latter are closed upon the spring.

After the jaw actuating member 135 has reached the limit of its outward movement by reason of the jaws 132 being closed upon the spring, the entire transfer member 119 is turned on the shaft 130 as a unit, thereby lifting the spring 45 into range of the second assembling transfer member 121 (see Fig. V). While the spring 45 is being grasped by the transfer member 121, the rack 149 starts moving downward, the result being first to open the jaws 132, then to pull them away from the spring (see Fig. XXIV) after which the whole transfer member 119 swings back to horizontal or receiving position.

The second assembling transfer member 121 comprises a pair of spring gripper jaws 171 carried by a reciprocating carriage 172 which is slidable on a horizontal track 173 (see Figs. I, II, III, XIV and XV). The carriage is reciprocated by a crank arm 174 to which it is connected by a connecting rod 174'. The crank arm is carried by a vertical shaft 170 which is driven from the shaft 151 through gears 175 and 176, sprockets 177, chain 178 and bevel gears 179 (see Figs. II, III and IV) the ratio of the driving means being such as to rotate the crank arm 174 one revolution each time a spring is made by the machine.

The gripper jaws 171 are pivoted at 180 to the carriage 172 (see Fig. XXV) and are connected by links 181 with a plunger 182 which is reciprocable in the carriage 172. While advancing to receive the spring 45 from the transfer member 119 (see Figs. I, II and III) the jaws 171 are held open by a latch 183 which engages a collar 184 on the plunger 182 (see Fig. XXV). The latch 183 is secured to a pivot shaft 185 which projects laterally from the carriage 172 and carries a downwardly projecting arm 186 (see Figs. XV and XXVI). The arm 186 carries a trip bolt 187 which is held yieldingly downward by a spring 188, its projecting being limited by stop nuts 189.

Just before the gripper jaws 171 reach the spring 45, the trip bolt 187 comes into contact with a stationary tripping lug 190 thereby swinging the arm 186 to lift the latch 183 out of engagement with the collar 184. This action permits the plunger 182 to be thrust forward by its actuating spring 191 (see Fig. XXV) to close the gripper jaws 171 upon the spring 45 (see dotted lines in Fig. XXV). The tripping lug 190 is supported by a rod 192 which is adjustably held in place in the outer tie bracket 193 of the carriage track 173 by the nuts 194 (see Figs. I and II), such adjustment determining the time of tripping of the jaws 171.

The plunger 182 carries a reset rod 195 reciprocable in a bearing 196 on the bracket 192 (see Figs. I, II and III). Shortly before the carriage 172 reaches the limit of forward movement, the reset rod is brought to rest by its stop 197 engaging with the bearing 196 thereby causing the remainder of the forward travel of the carriage to open the jaws 171, the spring 191 being compressed and the latch 183 dropping in front of the collar 184 to hold the jaws in open or set position (see Fig. XXV).

Opening of the jaws 171 releases the spring 45 which is left in the assembling chute 120 when the carriage 172 retreats to outer position. The lower end of the trip bolt 187 and one side of the trip lug 190 are beveled to cause the trip bolt to be lifted against the yielding pressure of the spring 188 in the arm 186 when the bolt encounters the lug during the backward movement of the carriage 172 thereby permitting passage of the bolt without turning the latch pivot shaft 185 (see Fig. XXVI).

The assembling chute 120 consists of side members 199, a bottom plate 200 and top plate 201 which are supported by a frame arm 202 and brace 203 (see Figs. I, II and III). The course of the springs through the chute is defined by guide bars 204 and 205 which extend the length of the chute and between which the springs pass (see Figs. XIV, XV, XXVII and XXVIII). There are two sets of these guide bars (see Fig. XV). The guide bars 204 are supported by brackets 206 which are secured to one of the side members 199 by bolts 207. The guide bars 205 are supported by brackets 208 on adjusting screws 209 which provide means of changing the distance between the opposed guide bars for springs of different length. When the spring 45 is seized by the transfer member 121, the end held by the transfer member 119 is in a fixed position regardless of the length of the spring (see Fig. V), therefore, the alignment of that end of the spring, with the assembling chute, is the same for all lengths of spring, and no adjustment of the guide bars 204 is needed.

For the purpose of aligning the transfer member 121 with springs of various lengths, the track 173 is adjustable transversely. The outer tie bracket 193 of the track 173 is slidable on a stationary supporting bracket 210 -(see Figs. II, III and XXIX) and is held in adjusted position by clamping screws 211 which project through a slot 212 in the bracket 210. The inner end of the track 173 is supported by tie brackets 214 which are adjustably secured to the chute 120 by bolts 215 extending through transversely disposed slots 216 in the bottom plate 200 (see Figs. XXVIII and XXX).

Each spring is guided between the guide bars 204 and 205 by guide members 218 which are secured to the ends of the guide bars (see Figs. I, II, XIV and XV). The members 218 flare at their outer ends to receive the spring, and converge at their inner ends to cause the spring to be compressed somewhat when forced between the guide bars 204 and 205 (see Fig. XV) this compression of the springs serving to frictionally hold them in place between the guide bars when released by the jaws 171. The transfer jaws leave the springs 45 in a position in which a portion of each of the end coils of the spring project rearwardly from the spring passage 219, thereby causing them to be embraced by the end coils of the next spring deposited by the transfer member. The addition of each spring pushes all of the springs immediately ahead of it along the passage 219, the springs being closely intermeshed or nested, as shown in Fig. XV.

The assembly of nested springs in the assembling chute 120 is divided by the flights 123 into groups or bundles 122, each containing a convenient number of springs for handling. The chain 124 which carries the flights 123 is intermittently driven by a sprocket 220 which is rotatably mounted upon a drive shaft 221 (see Figs. I, XIV and XXXI). The shaft 221 is driven from the shaft 151, the counter shaft 223 which carries the driven gear 176 and one of the sprockets 177, also carrying a sprocket 224 (see Fig. XXXII) which is operatively connected by a chain 225 with a driven sprocket 226 on the shaft 221 (see Figs. I, III and IV).

Although the shaft 221 rotates continuously, the sprocket 220 remains at rest except when it is operatively connected with the shaft. A suitable clutch for automatically locking the sprocket 220 to the shaft comprises a driven clutch member 228 which is secured to one side of the sprocket (see Fig. XXXI). The driven clutch member 228 is provided with a driven clutch jaw 230 which is mounted therein for axial movement and is controlled by the release member 231 carried by the clutch lever 232 (see Figs. XXXI and XXXIV). This release member 231 rests in an annular groove 233 in the driven clutch member 228 and engages a notch 234 in the driving jaw 230. When the release member is lifted from this notch 234, the driven jaw is projected by the spring 235 into range of the driving jaw 236 carried by the driving clutch member 237 which, in this embodiment, serves as a sprocket for driving other mechanisms on the machine. The driving lug or jaw 236 engages the jaw 230 and rotates the sprocket 220 until the driven jaw is again retracted by the release member 231, dropping back into range of the notch 234 of the driving jaw (see Fig. XXXVI). When the driving jaw is brought into engagement with the release member, the driving jaw is moved longitudinally, forcing the driven jaw back into the recess in the driven clutch member against the tension of the spring 235, disengaging the clutch and bringing the sprocket 220 to rest. To insure stopping of the sprocket when the clutch is released, the release member 231 is provided with a stop pin 238 projecting into range of an adjustable lug 239 on the driven collar 228—(see Figs. XIV and XXXV).

The clutch lever 232 is secured to a shaft 240 (see Fig. I) which also carries a cam lever 241. The cam lever engages a cam 242 which is rotatably mounted on the shaft 221 (see Figs. XXXI and XXXVII). The cam is intermittently driven by the ratchet wheel 244 (see Fig. XXXVIII) the latter being fixed to the cam (see Fig. XXXI). The ratchet lever is actuated by a reciprocating rod 245 which extends through a slot 246 in one end of the lever and carries adjustable tappets 247. The rod 245 is carried by the actuating rack 149 of the spring transfer member 119. Thus whenever the rack 149 moves downwardly to carry the transfer member 119 to receiving position, the ratchet lever 243 is actuated to turn the ratchet wheel one step. When the rack 149 moves upwardly to lift a spring from the knotter, the ratchet lever is actuated in the other direction, thereby actuating the ratchet pawl 243′ (see Fig. XXXVIII). To prevent over-running of the ratchet wheel 244 and also to insure that it remain stationary during the reset movement of the ratchet lever 243, a friction brake 248 engages the barrel or hub 249 which connects the ratchet wheel and the cam 242 (see Figs. XXXI and XXXIX). An arm extending from the brake 248 has a forked end engaging the clutch control shaft 240 to hold the brake from turning.

At each revolution of the cam 242 the cam lever 241 is actuated by the cam lift 251 (see Fig. XXXVII) thereby lifting the clutch release member 231 and causing the sprocket 220 to be turned one revolution. When the cam lift 251 has passed out of engagement with the roller 241′ of the cam lever, the clutch release member is forced back into releasing position by a spring 252 which is shown attached to the cam lever.

The turning of the sprocket 220 causes the assembled groups of springs 122 to be advanced through the assembling chute 120 by the chain flights 123 and leaves space in the entrance portion of the chamber for the assembling and nesting of a new group of springs. The number of teeth in the ratchet wheel 244 corresponds to the number of springs desired in a group, so that this number are nested into the chute 120 between movements of the chain 124. It is important that the cam 242 be so timed as to avoid interference between the spring transfer carriage 172 and the flight 123 when the latter enters the assembling chute.

The sprocket 220 and chain 124 may be aligned with springs of different lengths by sliding the sprocket and clutch to a different position on the shaft 221 and sliding the clutch lever 232 on the shaft 240, the position of the sprocket 220 being determined by the width of the spacer 253 (see Fig. XXXI) which may be changed for springs of different sizes. A similar spacer 254 is used to align the idle sprocket 255 at the other end of the assembling chute 120.

Each time that the groups of springs 122 and advanced in the assembling chute 120 by the chain 124, one group of springs is discharged from the chute and slid upon the delivery table 125 (see dotted outline in Fig. XXVII). Before the ejection of the next group of springs, the discharged row of springs is pushed along on the table 125 by the pusher 126. The pusher 126 is mounted upon a reciprocating carriage 256 which slides in a track 257 secured to the lower side of the table 125 (see Figs. XIV, XVI, XXVII and XXXX) the pusher being supported on a standard 258 which projects up through a slot 259 in the table. The carriage 256 is reciprocated by a crank arm 260 to which it is operatively connected by a connecting rod 261. The crank arm is carried by a vertical shaft 262 to which is also secured a worm wheel 263 in mesh with a worm 264. The worm shaft 265 is operatively connected by sprockets 266 and chains 267 to the shaft 268. A driven sprocket 269 on the shaft 268 is operatively connected by a chain 270 to the sprocket 237 on the clutch shaft 221 (see Figs. I, I$^a$ and II). In addition to serving as a part of the driving mechanism of the spring pusher, 126, the shaft 268 serves as a shaft for the idle sprocket 255 of the chain 124.

The ratio of the driving mechanism of the spring pusher carriage 256 corresponds to the number of teeth in the ratchet wheel 244 so that the crank shaft 262 turns exactly one revolution for each group of springs discharged upon the table 125. Thus each time a group of springs is ejected from the chute 120, the pusher member 126 pushes the springs along on the table and away from the end of the chute (see Figs. XXVII and XXXX) and returns to the end of the table in time to receive the next group of springs (see Fig. X and broken outline in Fig. XXVII). The table 125 can be of any length desired to provide space for the accumulation of a sufficient quantity of springs to permit one operator to dispose of the springs from several machines, or it may deliver as desired.

We have found the embodiment of our invention illustrated to be highly practical. We have not attempted to illustratel to be highly practical. We have not attempted to illustrate various modifications and adaptations which we contemplate as we believe the disclosure made will enable those skilled in the art to which our invention relates to embody or adapt the same as may be desired.

Having thus described our invention what we claim as new and desire to secure by Letters Patent is:

1. In a structure of the class described, the combination of an assembling chute comprising top and bottom walls, side walls disposed between said top and bottom walls, at least one of said side walls being adjustably supported, means for successively feeding springs to the forward end of said chute, an ejector comprising sprockets mounted in a plane above said chute for axial adjustment, a conveyor chain carried by said sprockets, flights mounted on said conveyor chain and adapted on their operative reach to project through the slots in said side walls of said chute, means for driving said conveyor chain with a step by step movement operatively associated with said feed means whereby the actuation of the ejector conveyor is timed to discharge the springs in assembled groups, a delivery table disposed transversely of the said assembling chute and to which the groups of springs are discharged from said chute, a reciprocating pusher adapted to shift the groups of springs on said delivery table from the path of the groups of springs delivered by said ejector, and operating means for said pusher whereby its actuation is timed.

2. In a structure of the class described, the combination of an assembling chute comprising top and bottom walls, side walls disposed between said top and bottom walls, at least one of said side walls being adjustably supported, means for successively feeding springs to the forward end of said chute, an ejector comprising sprockets mounted in a plane above said chute for axial adjustment, a conveyor chain carried by said sprockets, flights mounted on said conveyor chain and adapted on their operative reach to project through the slots in said side walls of said chute, and means for driving said conveyor chain with a step by step movement operatively associated with said feed means whereby the actuation of the ejector conveyor is timed to discharge the springs in assembled groups.

3. In a structure of the class described, the combination of an assembling chute comprising top and bottom walls, side walls disposed between said top and bottom walls, means for successively feeding springs to the forward end of said chute, an ejector comprising sprockets, a conveyor chain carried by said sprockets, flights mounted on said conveyor chain and adapted on their operative reach to project through the slots in said side walls of said chute, means for driving said conveyor chain with a step by step movement operatively associated with said feed means whereby the actuation of the ejector conveyor is timed to discharge the springs in assembled groups, a delivery table disposed transversely of the said assembling chute and to which the groups of springs are discharged from said chute, a reciprocating pusher adapted to shift the groups of springs on said delivery table from the path of the groups of springs delivered by said ejector, and operating means for said pusher whereby its actuation is timed.

4. In a structure of the class described, the combination of an assembling chute comprising top and bottom walls, side walls disposed between said top and bottom walls, means for successively feeding springs to the forward end of said chute, an ejector comprising sprockets, a conveyor chain carried by said sprockets, flights mounted on said conveyor chain and adapted on their operative reach to project through the slots in said side walls of said chute, and means for driving said conveyor chain with a step by step movement operatively associated with said feed means whereby the actuation of the ejector conveyor is timed to discharge the springs in assembled groups.

5. In a structure of the class described, the combination of an assembling chute including an adjustable side wall, means for successively feeding springs to the forward end of said chute, an ejector comprising sprockets mounted for lateral adjustment, a conveyor chain carried by said sprockets, flights mounted on said conveyor chain to sweep through said chute, means for driving said conveyor chain with a step by step movement operatively associated with said feed means whereby the actuation of the ejector conveyor is timed to discharge the springs in assembled groups, a delivery table disposed transversely of the said assembling chute and to which the groups of springs are discharged from said chute, a reciprocating pusher adapted to shift the groups of springs on said delivery table from the path of the groups of springs delivered by said ejector, and operating connections for said pusher whereby its actuation is timed.

6. In a structure of the class described, the combination of an assembling chute, means for successively feeding springs to the forward end of said chute, an ejector, a conveyor chain, flights mounted on said conveyor chain to sweep through said chute, means for driving said conveyor chain with a step by step movement operatively associated with said feed means whereby the actuation of the ejector conveyor is timed to discharge the springs in assembled groups, a delivery table disposed transversely of the said assembling chute and to which the groups of springs are discharged from said chute, a reciprocating pusher adapted to shift the groups of springs on said delivery table from the path of the groups of springs delivered by said ejector, and operating connections for said pusher whereby its actuation is timed.

7. In a structure of the class described, the combination of an assembling chute including an adjustable side wall, means for successively feeding springs to the forward end of said chute, an ejector comprising sprockets mounted for lateral adjustment, a conveyor chain carried by said sprockets, flights mounted on said conveyor chain to sweep through said chute, and means for driving said conveyor chain with a step by step movement operatively associated with said feed means whereby the actuation of the ejector conveyor is timed to discharge the springs in assembled groups.

8. In a structure of the class described, the combination of an assembling chute comprising top and bottom walls, side walls disposed between said top and bottom walls, at least one of said side walls being adjustably supported, means for successively feeding springs to the forward end of said chute, an ejector comprising a conveyor chain provided with flights adapted to sweep through said chute, means for driving said conveyor chain with a step by step movement operatively associated with said feed means whereby the actuation of the ejector conveyor is timed to discharge the springs in assembled groups, a delivery table disposed transversely of the said assembling chute and to which the groups of springs are discharged from said chute, a reciprocating pusher adapted to shift the groups of springs on said delivery table from the path of the groups of springs delivered by said ejector, and operating means for said pusher whereby its actuation is timed.

9. In a structure of the class described, the combination of an assembling chute comprising top and bottom walls, side walls disposed between said top and bottom walls, at least one of said side walls being adjustably supported, means for successively feeding springs to the forward end of said chute, an ejector comprising a conveyor chain provided with flights adapted to sweep through said chute, and means for driving said conveyor chain with a step by step movement operatively associated with said feed means whereby the actuation of the ejector conveyor is timed to discharge the springs in assembled groups.

10. In a structure of the class described, the combination of an assembling chute comprising top and bottom walls, side walls disposed between said top and bottom walls, means for adjustably supporting one of said side walls, means for successively feeding springs to the forward end of said chute adapted to engage the springs intermediate the ends thereof, guide members for said springs having parallel rear portions, outwardly flaring front portions and converging portions intermediate said front and rear portions whereby the outer coils of the springs are guided into nesting relation with the outer coils of the preceding spring, an ejector comprising sprockets mounted for axial adjustment, a conveyor chain carried by said sprockets, flights mounted on said conveyor chain to travel through said chute and adapted when traveling therethrough to project through the slots in the side walls of the chute, and means for driving said conveyor chain with a step by step movement timed to discharge the springs in assembled groups.

11. In a structure of the class described, the combination of an assembling chute comprising top and bottom walls, side walls disposed between said top and bottom walls, means for adjustably supporting one of said side walls, means for successively feeding springs to the forward end of said chute adapted to engage the springs intermediate the ends thereof, flights mounted on said conveyor chain to travel through said chute and adapted when traveling therethrough to project through the slots in the side walls of the chute, and means for driving said conveyor chain with a step by step movement timed to discharge the springs in assembled groups.

12. In a structure of the class described, the combination of an assembling chute, means for sucessively feeding springs to the forward end of said chute adapted to engage the springs intermediate the ends thereof, guide members for said springs having parallel rear portions, outwardly flaring front portions and converging portions intermediate said front and rear portions, the feed means being adapted to release the springs, with the front edges of the outer coils of the spring engaging the said parallel rear portions of the chute and the rear edges of the outer coils thereof opposite said converging portions, the distance between the said parallel rear portions being less than that between said front portions, whereby the outer coils of succeeding springs are guided into embracing nesting relation with the preceding springs, an ejector, and means for driving said ejector timed to discharge the springs in assembled groups.

13. In a structure of the class described, the combination of an assembling chute comprising adjustably associated opposed guiding members disposed at the front of said chute and comprising flanged flaring front portions, said guide members having opposed inwardly converging intermediate portions and parallel chute portions at the rear thereof, and means for successively feeding the springs through said guide members, said feed means being adapted to engage the springs intermediate their end coils.

14. In a structure of the class described, the combination of an assembling chute comprising opposed guiding members disposed at the front of said chute and comprising flanged flaring front portions, said guide members having opposed inwardly converging intermediate portions and parallel chute portions at the rear thereof, and means for successively feeding the springs through said guide members, said feed means being adapted to engage the springs intermediate their end coils and to release the springs, with the front edges of the outer coils of the spring engaging the said parallel rear portions of the chute and the rear edges of their outer coils opposite said converging portions of said guide members, the distance between the said parallel rear portions being less than that between said front portions, whereby they are positioned to receive the end coils of the succeeding spring at the outside thereof.

15. In a structure of the class described, the combination of an assembling chute comprising opposed guiding members disposed at the front of said chute and having an opposed inwardly converging portion, and means for sucessively feeding the springs through said guide members, said feed means being adapted to engage the springs intermediate their end coils and to release the springs, with the front edges of the outer coils of the spring engaging the said parallel rear portions of the chute and the rear edges of their outer coils opposite said converging portions of said guide members, the distance between the said parallel rear portions being less than that between said front portions, whereby they are positioned to receive the end coils of the succeeding spring at the outside thereof.

16. In a structure of the class described, the combination of an assembling chute having parallel side walls, means for successively feeding springs to said chute adapted to engage the springs intermediate the ends thereof, and means facilitating the nesting of the springs consisting of flaring flanged guide members having opposed surfaces converging to and merging into said chute side walls and across which the springs are delivered by said feed means, said feed means being adapted to release the springs with the front edges of their outer coils between the sides of said assembling chute and with the rear edges of their outer coils in opposed relation to said converging surfaces so that the outer coils of succeeding springs are guided into embracing relation thereto.

17. In a structure of the class described, the combination of an assembling chute having parallel side walls, means for successively feeding springs to said chute adapted to engage the springs intermediate the ends thereof, and means facilitating the nesting of the springs consisting of guide members having opposed surfaces converging to and merging into said chute side walls and across which the springs are delivered by said feed means, said feed means being adapted to release the springs with the front edges of their outer coils between the sides of said assembling chute and with the rear edges of their outer coils in opposed relation to said converging surfaces so that the outer coils of succeeding springs are guided into embracing relation thereto.

18. In a structure of the class described, the combination of an assembling chute, means for successively feeding springs to said chute whereby they are associated in nested relation, means for ejecting the springs in assembled groups, a table disposed at the rear of said chute and to which the assembled groups of springs are delivered, and means for advancing the springs on said table operated in synchronism with said means for ejecting the springs from said chute.

19. In a structure of the class described, the combination of an assembling chute, means for successively feeding the springs to the forward end of said chute, an ejector comprising sprockets, a conveyor chain carried by said sprockets, flights mounted on said conveyor chain to sweep through said chute, operating connections for said ejector to said feed means whereby the springs are discharged from the chute in assembled groups, a longitudinally slotted table disposed at the rear of said chute and to which the springs are delivered, a pusher for advancing the springs on said table, a carriage for said pusher mounted below said table, a crank, a pitman connecting said crank to said slide, a worm gear on said crank, a coacting driving worm therefor, and driving connections for said worm to said conveyor sprocket.

20. In a structure of the class described, the combination of an assembling chute, means for successively feeding the springs to the forward end of said chute, an ejector comprising sprockets, a conveyor chain carried by said sprockets, flights mounted on said conveyor chain to sweep through said chute, operating connections for said ejector to said feed means whereby the springs are discharged from the chute in assembled groups, a longitudinally slotted table disposed at the rear of said chute and to which the springs are delivered, a pusher for advancing the springs on said table, a carriage for said pusher mounted below said table, and driving connections for said conveyor to said carriage.

21. In a structure of the class described, the combination of an assembling chute, means for successively feeding the springs to the forward end of said chute, an ejector, operating connections for said ejector to said feed means whereby the springs are discharged from the chute in assembled groups, a longitudinally slotted table disposed at the rear of said chute and to which the springs are delivered, a pusher for advancing the springs on said table, a carriage for said pusher mounted below said table, and operating connections for said carriage to said ejector.

In witness whereof we have hereunto set our hands.

BERT L. VAN ORMAN.
ROSS V. HEILMAN.